United States Patent Office 2,983,724
Patented May 9, 1961

2,983,724

FUNGICIDE RECOVERY FROM CABBAGE PALMETTO

Irwin A. Pearl, Appleton, Wis., assignor to The Institute of Paper Chemistry, Appleton, Wis., a corporation of Wisconsin No Drawing. Filed Apr. 3, 1958, Ser. No. 726,026

6 Claims. (Cl. 260—236.5)

This invention relates generally to the treatment of a plant for the recovery of a product useful for various purposes and, more particularly, it relates to a process for treating Sabal palmetto which is more generally known as cabbage palmetto.

In the southeastern part of the United States, and particularly in South Carolina, Georgia, and Florida, and in the West Indies, there grows a weed plant which is botanically known as Sabal palmetto and which is more commonly known as cabbage palmetto. When it grows in forests, it must be removed before the more valuable woods can be recovered from the forests. This plant has had very limited utility but has been used for pilings. The leaves of the cabbage palmetto have been employed as a source of wax material, providing a wax like carnauba wax, and strips of the leaves have been used for weaving purposes. In addition, the outer skin of the stem of this plant have been used for providing a source of fiber for spinning into a thread. Otherwise, the cabbage palmetto has been considered a weed of the plant kingdom.

I have discovered that by taking the stem material of the cabbage palmetto and subjecting it to alkaline treatment, I can recover a valuable by-product which is useful in the manufacture of synthetic resins and fibers and which is also useful in the production of preservative and fungicidal products.

It is an object of my invention to provide a new process for treating cabbage palmetto, and a more particular object of my invention is the recovery of a product from cabbage palmetto which can be used in the manufacture of synthetic resin fiber, fungicidal and preservative products, and other materials.

These and other objects of this invention are accomplished by subjecting the stem material of cabbage palmetto to alkaline treatment and thereby recovering an alkaline solution. This solution is neutralized with acid, in accordance with my invention, and, after neutralization, dissolved materials are removed by means of a liquid-liquid extraction. In the extraction step, I use well known water-immiscible extracting solvents such as ether, benzene, trichloroethylene, and various other well known solvents. The extracted materials are recovered from the solvent as by separating from the solvent by distillation, thereby leaving a residue. The resultant material is valuable in the manufacture of synthetic resins and fibers, and fungicidal and preservative products. The residue can be further purified by re-crystallization from water and any remaining color can be removed by use of decolorizing carbon.

More particularly, the process of my invention is practiced by taking the stem material of cabbage palmetto and cutting it up into relatively small size. The cut material is immersed in an alkaline solution having a pH in excess of about 10. The solution is heated to a temperature in excess of about 60° C. for about six hours. It will be understood, of course, that higher and lower temperatures can be utilized and the time adjusted inversely with the temperature. In other words, at higher temperatures, shorter treating periods can be utilized whereas at lower temperatures longer treating periods will be necessary.

After cooking, the solution is cooled and neutralized with mineral acid to a pH of less than about 7 and preferably below 6. The amount of acid which is used is not important so long as the desired pH change is effected but, of course, excessive use of acid increases the cost of the process.

After neutralization, a liquid-liquid extraction is effected by the use of well known water immiscible organic solutions. The extraction may be effected by mixing the organic solvent and aqueous solution by shaking or by continuous extraction techniques. Thereafter, the organic solvent, with extracted material therein, is separated from the aqueous mixture.

The solvent is then removed by distillation and a residue remains which is light brown in color. This distillation should be carried out at a temperature which does not damage or modify the residue.

As before indicated, the residue may be further purified by dissolving in hot water, thereby solubilizing the water-soluble materials. In this connection, the water is preferably brought to boiling, causing substantially all of the residue to be dissolved and leaving behind a small amount of highly colored tars or other insoluble products. The hot solution is then cooled to effect crystallization and the resulting crystals are substantially white in color and have a melting point of 208° C. to 209° C.

The resulting product can be used in the preparation of polyester type resins and fibers. The product not only can be polymerized with or without modification or subsequent treatment. It also has strong fungicidal and preservative properties and can be readily esterified or otherwise modified to produce products having such properties.

As a specific example of the practice of my invention, a piece of cabbage palmetto from Florida was stripped of its outer skin material and was ground to a particle size smaller than about 10 mesh. The ground material was immersed in a 1 N sodium hydroxide solution. In such proportion, the alkali was in great excess. The solution was heated to boiling and refluxed for six hours. The solution was then cooled to room temperature. Thereafter, the solution was filtered from the residual material through a sintered glass funnel.

To the recovered solution was added 6 N sulfuric acid, the acid being added in an amount sufficient to reduce the pH to about 3.0. The acidified solution was submitted to continuous extraction with ethyl ether. The extraction was effected in a countercurrent extractor which provided an ether solution which was separated from the aqueous phase, the dissolved materials being in the ether solution. This extraction was effected at room temperature. The ether was removed by distillation at a temperature of about 35° C. A light brown residue was left in the amount of 3.83 grams.

This residue was dissolved in 100 grams of water at boiling temperature in the presence of about 1 gram of decolorizing carbon. The hot solution was then filtered, leaving behind the carbon with some colored material, and the solution was then cooled to about 10° C. to 15° C., whereupon white crystals precipitated from the solution. The solution was filtered through filter paper to recover the crystals. The crystals were substantially white in color and 3.1 grams of the crystals were recovered. The crystals had a melting point of 208° C. to 209° C.

As another example, the foregoing procedure is followed except that the cabbage palmetto immersed in alkaline solution is heated to 170° C., under pressure, for 30 minutes.

As still another example, the procedure of the preceding example is followed, except that the alkaline solution comprises 1 liter of 2 N sodium hydroxide and the 170° C. temperature is maintained for three hours.

As a fourth example, 100 grams of cabbage palmetto ground to pass a 10 mesh screen is immersed in 3 liters of water and 100 grams of lime (slaked lime) is added. The mixture is heated to 170° C., under pressure, for three hours. The mixture is filtered in a filter press and the filtrate is acidified to pH 3 by a two step process. In this connection, carbon dioxide is bubbled through the filtrate until a pH of about 8 is reached. The solution is then passed through a filter press to remove calcium carbonate. This filtrate is further acidified by pH 3 with 6 N sulfuric acid. The acidified solution is extracted and the subsequent steps described in the first example are followed.

In the practice of this invention, various alkalis may be used and, in this connection, calcium hydroxide and potassium hydroxide may be employed as well as lime, sodium carbonate and other known alkaline compounds which are capable of establishing a pH in excess of about 10. In addition, various mineral acid agents can be used for neutralizing and, in this connection, hydrochloric acid, sulfur dioxide, phosphoric acid, and other acidifying agents which do not oxidize or otherwise modify the material may be employed. As has been previously pointed out, various organic solvents can also be employed for the extraction.

The concentration of alkali and the ratio of plant material to alkali may be varied over a substantial range. In this connection, dilute alkaline solutions may be utilized and high ratios of plant material to alkali can also be used. Adjustment of these conditions to recover the maximum amount of residue is within the skill of the art.

The heating of the alkaline solution is preferably carried out at temperatures between about 50° C. and about 200° C. for between about 30 minutes and about 12 hours. As before indicated, the time of heating is inversely related to the temperature and, in general, the higher recoveries of residue are effected at longer times and higher temperatures. Of course, there is a limit upon the amount recovered because of the limitation upon the amount of residue material which is present in the cabbage palmetto.

It will be understood that various process techniques can be used to effect the recovery of the material of the invention from cabbage palmetto.

Various features of this invention, which are believed to be new, are set forth in the following claims:

I claim:
1. A process for recovering products having fungicidal properties from cabbage palmetto, which comprises the steps of immersing the cabbage palmetto in an alkaline solution having a pH in excess of about 10, neutralizing said solution with a non-oxidizing, non-reducing mineral acid agent to a pH below about 7, extracting said neutralized solution with a water immiscible, organic solvent and separating the organic solvent from dissolved material, thereby providing a product having fungicidal properties.

2. A process for recovering products having fungicidal properties from cabbage palmetto, which comprises the steps of immersing the cabbage palmetto in an alkaline solution having a pH in excess of about 10, heating said alkaline solution, neutralizing said solution with a non-oxidizing, non-reducing mineral acid agent to a pH below about 7, extracting said neutralized solution with a water immiscible, organic solvent and separating the organic solvent from dissolved material, thereby providing a product having fungicidal properties.

3. A process for recovering products having fungicidal properties from cabbage palmetto, which comprises the steps of immersing the cabbage palmetto in an alkaline solution having a pH in excess of about .10, heating said alkaline solution, removing the alkaline solution from the undissolved materials, neutralizing said solution with a non-oxidizing, non-reducing mineral acid agent selected from the group consisting of hydrochloric acid, sulfuric acid, and sulfur dioxide to a pH below about 7, extracting said neutralized solution with a water immiscible, organic solvent and separating the solvent from dissolved material, thereby providing a product having fungicidal properties.

4. A process for recovering products having fungicidal properties from cabbage palmetto, which comprises the steps of immersing the cabbage palmetto in an alkaline solution having a pH in excess of about 10, heating said alkaline solution for a time between about 30 minutes and about 12 hours at a temperature between about 50° C. and about 200° C., removing the alkaline solution from the undissolved materials, neutralizing said solution with a non-oxidizing, non-reducing mineral acid agent selected from the group consisting of hydrochloric acid, sulfuric acid, and sulfur dioxide to a pH below about 7, extracting said neutralized solution with a water immiscible, organic solvent and separating the solvent from dissolved material, thereby providing a product having fungicidal properties.

5. A process for recovering products having fungicidal properties from cabbage palmetto, which comprises the steps of immersing the cabbage palmetto in an alkaline solution having a pH in excess of about 10, heating said alkaline solution under conditions equivalent to boiling for six hours, removing the alkaline solution from the undissolved materials, neutralizing said solution with a non-oxidizing, non-reducing mineral acid agent selected from the group consisting of hydrochloric acid, sulfuric acid, and sulfur dioxide to a pH below about 7, extracting said neutralized solution with a water immiscible, organic solvent and separating the solvent from dissolved material, thereby providing a product having fungicidal properties.

6. A process for recovering products having fungicidal properties from cabbage palmetto, which comprises the steps of immersing the cabbage palmetto in an alkaline solution having a pH in excess of about 10, heating said alkaline solution under conditions equivalent to 170° C. for 30 minutes, removing the alkaline solution from the undissolved materials, neutralizing said solution with a non-oxidizing, non-reducing mineral acid agent selected from the group consisting of hydrochloric acid, sulfuric acid, and sulfur dioxide to a pH below about 7, extracting said neutralized solution with a water immiscible, organic solvent and separating the solvent from dissolved material, thereby providing a product having fungicidal properties.

No references cited.